(12) United States Patent
Gray

(10) Patent No.: US 8,700,472 B2
(45) Date of Patent: Apr. 15, 2014

(54) GIFT-CARD AND ONLINE PAYMENT SYSTEM

(75) Inventor: Beau Gray, Pittsburgh, PA (US)

(73) Assignee: Retail Royalty Company, Las Vegas, NV (US)

( * ) Notice: Subject to any disclaimer, the term of this patent is extended or adjusted under 35 U.S.C. 154(b) by 147 days.

(21) Appl. No.: 12/904,601

(22) Filed: Oct. 14, 2010

(65) Prior Publication Data

US 2011/0112919 A1 May 12, 2011

Related U.S. Application Data

(60) Provisional application No. 61/251,590, filed on Oct. 14, 2009.

(51) Int. Cl.
*G06Q 20/00* (2012.01)
*G06Q 30/00* (2012.01)

(52) U.S. Cl.
USPC .......................................... 705/17; 705/26.1

(58) Field of Classification Search
USPC ............................................................. 705/17
See application file for complete search history.

(56) References Cited

U.S. PATENT DOCUMENTS

| | | | |
|---|---|---|---|
| 5,680,528 A | 10/1997 | Korszun | 395/135 |
| 5,930,769 A | 7/1999 | Rose | 705/27 |
| 6,206,750 B1 | 3/2001 | Barad et al. | 446/268 |
| 6,307,568 B1 | 10/2001 | Rom | 345/629 |
| 6,310,627 B1 | 10/2001 | Sakaguchi | 345/630 |
| 6,317,722 B1 | 11/2001 | Jacobi et al. | 750/14 |
| 6,546,309 B1 | 4/2003 | Gazzuolo | 700/132 |
| 6,901,379 B1 | 5/2005 | Balter et al. | 705/27 |
| 6,903,756 B1 | 6/2005 | Giannini | 345/747 |
| 7,082,416 B2 | 7/2006 | Anderson | 705/74 |
| 7,133,839 B2 | 11/2006 | Inoue et al. | 750/27 |
| 7,149,665 B2 | 12/2006 | Feld et al. | 703/2 |
| 7,149,710 B1 | 12/2006 | Edmark | 705/26 |
| 7,194,428 B2 | 3/2007 | Wan et al. | 705/26 |
| 7,908,179 B2 * | 3/2011 | Karas et al. | 705/26.1 |
| 2001/0039517 A1 | 11/2001 | Kawakatsu | 705/26 |
| 2002/0099667 A1* | 7/2002 | Diamandis et al. | 705/74 |
| 2003/0115105 A1 | 6/2003 | Lin et al. | 705/26 |
| 2004/0039592 A1 | 2/2004 | Shima | 705/1 |
| 2005/0071242 A1 | 3/2005 | Allen et al. | 705/26 |
| 2005/0108130 A1 | 5/2005 | Monk | 705/35 |
| 2005/0165649 A1 | 7/2005 | Mahaffey et al. | 705/26 |
| 2005/0197927 A1 | 9/2005 | Martineau et al. | 705/27 |
| 2005/0251469 A1* | 11/2005 | Nandakumar | 705/35 |
| 2005/0261968 A1* | 11/2005 | Randall et al. | 705/16 |
| 2007/0174143 A1 | 7/2007 | Smilowitz et al. | 705/27 |
| 2007/0282741 A1 | 12/2007 | Kumar et al. | 705/40 |
| 2009/0048935 A1 | 2/2009 | Blanc et al. | 705/17 |
| 2009/0106115 A1 | 4/2009 | James et al. | 705/14 |

OTHER PUBLICATIONS

Website, www.wetseal.com/outfitter/outfitter.jsp, Oct. 7, 2009.
Website, http//tinachen.org/portfolio/stylemaker.html, Jun. 10, 2008.

* cited by examiner

*Primary Examiner* — Garcia Ade
(74) *Attorney, Agent, or Firm* — Wood, Herron & Evans, LLP

(57) ABSTRACT

A method, system, media, and device are directed to providing a check-out of a merchant transaction. A gift-card redemption interface is provided for redeeming a gift-card. A payment interface is provided for presenting a plurality of additional non-gift-card payment options comprising a credit-card payment option and a non-credit-card payment option. A mechanism is provided for performing operations. The operations include restricting a use of the gift-card redemption interface with the payment options; and processing the merchant transaction based on payments the gift-card.

24 Claims, 14 Drawing Sheets

GIFT-CARD AND ONLINE PAYMENT SYSTEM

CROSS-REFERENCE TO RELATED APPLICATIONS

This application claims the benefit of provisional application 61/251,590 filed Oct. 14, 2009, the entire content of which is expressly incorporated herein by reference thereto.

TECHNICAL FIELD

The present invention relates to a method, system, apparatus, and media for processing merchant transactions. More particularly, but not exclusively, the present invention relates to managing a gift-card redemption.

BACKGROUND

Online shopping systems enable shoppers to purchase items using credit-cards or other payment mechanism. Shoppers may sometimes be able to use gift-cards. However, the processes and interfaces for purchasing items may be time consuming or confusing. Also, there may be several gift-cards that may be usable, thus leading to more confusion. It is with respect to these considerations and others that the present invention is directed.

SUMMARY

The invention is directed to a method, device, system, and media for providing a check-out of a merchant transaction. One embodiment of the process includes providing a gift-card redemption interface for redeeming a gift-card; providing a payment interface for presenting a plurality of additional non-gift-card payment options comprising a credit-card payment option and a non-credit-card payment option; providing a mechanism for performing operations. The operations can include restricting a use of the gift-card redemption interface with the payment options; and processing the merchant transaction based on payments from the gift-card.

In a preferred embodiment, the gift-card redemption interface and the payment interface are configured to be provided in a side-by-side view. The non-credit-card payment option can include a bill-me-later option or a payment from an online account. The method can also include providing a purchase interface for modifying the merchant transaction in a side-by-side view with the gift-card redemption interface. In one embodiment, restricting the use of the gift-card redemption interface can include at least one of disabling a user interface entry for the non-credit-card payment option if the gift-card redemption interface is selected and/or restricting a use of a combination of the gift-card and at least one of the non-gift card payment options for the payments. The method can further include the step of including in the payments to be processed another payment from the credit-card option if a value of the gift-card is insufficient to pay for the merchant transaction.

The method can also include providing a credit value for fulfilling another merchant transaction; and applying the credit value to the payments before processing the merchant transaction. The method can also include storing in a computer memory information about any remaining balance on the gift-card after processing the merchant transaction; and providing the gift-card with the remaining balance as an option for fulfilling another merchant transaction.

In one embodiment, processing the merchant transaction further can include sending, to a payment processor, the merchant transaction and payments. Providing the gift-card redemption interface can also include providing an entry for a gift-card or a selection of at least one available gift-card for a user authorized to fulfill the merchant transaction.

In a preferred embodiment, the gift-card redemption provides a management of a plurality of gift-cards, wherein the management comprises adding or removing the gift-cards, or modifying attributes of the plurality of gift-cards.

In a preferred embodiment, the steps of providing the gift-card redemption interface and providing the payment interface can be performed by a server device, wherein the server device provides the interfaces over a network to a client device, and wherein the step of restricting can be performed by the client device. The step of restricting can be performed by a browser operating within the client device. In one embodiment, the browser receives the interfaces, restricts the use of the gift-card, and receives the combination of the gift-card and the credit-card payment option asynchronous with communications to the server device. In one embodiment, the payment interface is provided as a flip-through interface that operates within the browser asynchronous with communications to the server device.

The invention also relates to a system for providing a check-out of a merchant transaction. One embodiment of the system includes a server device configured to perform actions comprising providing a gift-card redemption interface for redeeming a gift-card; and providing a payment interface for providing a plurality of additional non-gift-card payment options comprising a credit-card payment option and a non-credit-card payment option.

The system can also include a client device in communication with the server device and configured to perform actions comprising restricting a use of the gift-card redemption interface to a provided payment option of the plurality of additional non-gift-card payment options; and processing the merchant transaction based on payments from the gift-card.

In one embodiment, the actions of the client device further include providing the gift-card redemption interface, the payment interface, and a purchase interface for modifying the merchant transaction in a side-by-side view. In one embodiment, restricting the provided payment option includes disabling a user interface entry for the non-credit-card payment option or the gift-card redemption interface. In one embodiment, the actions of the client device further include including in the payments to be processed another payment from the credit-card option if a value of the gift-card is insufficient to pay for the merchant transaction.

The invention also relates to a processor readable medium for providing a check-out of a merchant transaction comprising instructions that when executed by processor causes the processor to perform actions. The actions can include providing a gift-card redemption interface for redeeming a gift-card; providing a payment interface for providing a plurality of additional non-gift-card payment options comprising a credit-card payment option and a non-credit-card payment option; and providing a mechanism for performing operations. The operations can include restricting a use of the gift-card redemption interface with the payment options; and processing the merchant transaction based on payments from a combination of the gift-card and any necessary amounts from the credit-card payment option if a value of the gift-card is insufficient to pay for the merchant transaction. The medium can be executed within a server device.

The invention also relates to a processor readable medium for providing a check-out of a merchant transaction comprising instructions that when executed by processor causes the processor to perform actions. The actions can include receiving a gift-card redemption interface for redeeming a gift-card; receiving a payment interface with a plurality of additional non-gift-card payment options comprising a credit-card payment option and a non-credit-card payment option; restricting a use of the gift-card redemption interface with the payment options; and processing the merchant transaction based on payments from a combination of the gift-card and any necessary amounts from the credit-card payment option if a value of the gift-card is insufficient to pay for the merchant transaction. In one embodiment, the medium can comprise HTML and/or Javascript code. The medium can be executed within a client device and/or within a browser.

The invention also relates to a computer implemented interface configured. The interface is configured to provide the ability to accept multiple cards for payments and to combine the card payments with other forms of tender; automatically block determined combinations of tenders; and provide projected post transaction value of each of the multiple cards used for payments. The interface may include a digital wallet configured to provide a plurality of images of the multiple cards. The images can be configured to be selected to activate the card to be used for payments. In one embodiment, the multiple cards comprise at least one gift-card. In one embodiment, the combinations of tenders are blocked real-time.

BRIEF DESCRIPTION OF THE DRAWINGS

Further features of the invention, its nature and various advantages will be more apparent from the following detailed description, taken in conjunction with the accompanying drawings in which like reference characters refer to like parts throughout, and in which:

FIGS. 5A-5J show examples of user interfaces and a process for providing a check-out of a merchant transaction in accordance with one embodiment of the invention.

DETAILED DESCRIPTION OF EMBODIMENTS

As used herein, the term "component" refers to computer implemented mechanisms, including software combined with hardware such as a computer process and/or computer memory, or purely hardware mechanisms such as an application-specific integrated circuit (ASIC), or the like.

Generally, the invention relates to a system, method and associated devices for providing a mechanism and an interface to check-out and pay for merchant transaction (e.g., a basket of apparel) using at least one gift-cards along with other billing mechanisms, such as a credit-card, PayPal, and bill-me-later. A "credit-card", as used herein, includes check-cards, debit-cards, or the like. The interface allows multiple payment options combined with gift-cards purchases to be presented in a side-by-side view.

The mechanisms described herein can be used in conjunction with a shopping website including a digital closet for purchasing clothing items such as those described in U.S. patent application Ser. No. 12/575,299 entitled "METHODS AND SYSTEMS FOR ONLINE SHOPPING", filed Oct. 7, 2009 which is incorporated herein by reference.

Figure 1:
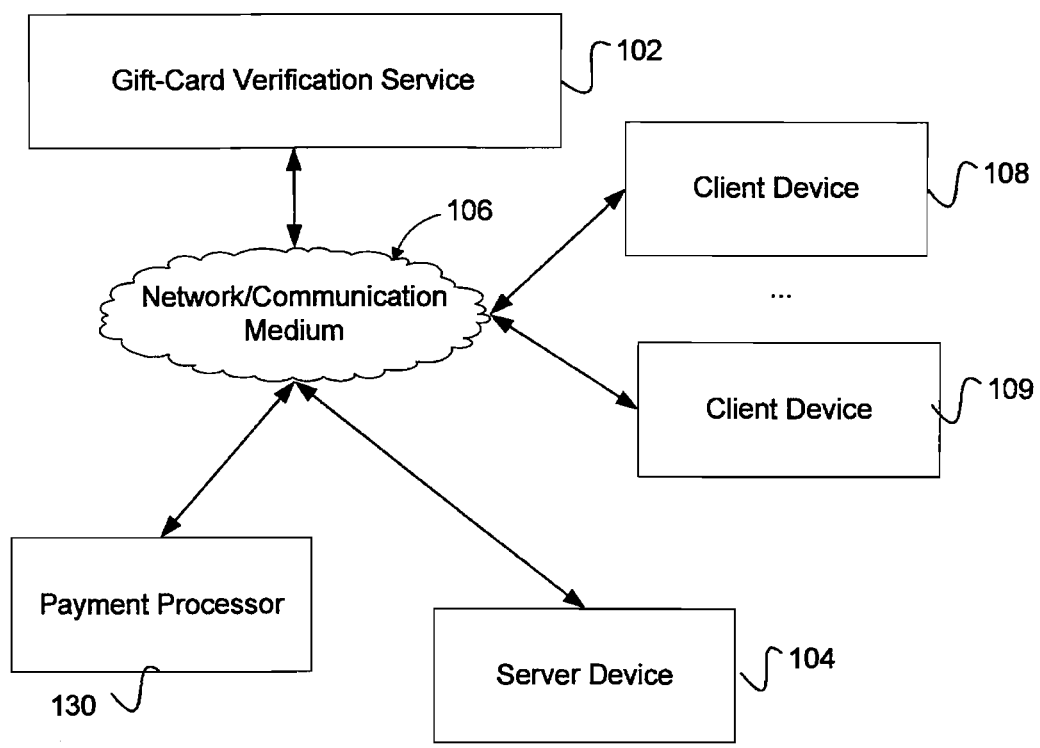
FIG. 1 shows a block diagram of a system for providing for providing a check-out of a merchant transaction in accordance with one embodiment of the invention.

FIG. 1 shows a block diagram of a system for providing a check-out of a merchant transaction in accordance with one embodiment of the invention. As shown, the system of FIG. 1 includes gift-card verifications service 102, client devices 108-109, server device 104, and payment processor 130. These devices are in communication with each other over a network/communication medium 106. The network can be the Internet, a wireless network, or the like.

Server device 104 includes any component configured to manage the merchant transactions. Server device 104 can provide a gift-card redemption interface for redeeming a gift-card to client devices 108-109 over network 106, and/or provide a payment interface for providing a plurality of additional payment options (e.g., non-gift-card payment options) comprising a credit-card payment option and a non-credit-card payment option to client devices 108-109 over network 106. Server device 104 can confirm that the gift-card is valid by sending such information to gift-card verification service 102 and receiving a confirmation. Server device 104 can send any received payment information, including a combination of the gift-card and other payment options to payment processor 130 for processing and fulfillment. In one embodiment, server device 104 can be a web server, can provide a web service, or the like. Server device 104 can provide its web interfaces as HTML, XML, web services Application Programming Interface (API), Javascript Object Notation (JSON) services, Asynchronous Javascript and XML (AJAX) services, or the like.

Client devices 108-109 include any components configured to provide an interface for a user to manage the merchant transactions. Client devices 108-109 can restrict or otherwise block a use of the gift-card redemption interface to a provided payment option of the plurality of additional payment options (e.g., non-gift-card payment options); and can process the merchant transaction based on payments including a gift-card payment and/or other payment options. In one embodiment, the processing of the merchant transaction can include sending the merchant transaction and the payments to payment processor 130 for processing and fulfillment.

Gift-card verification service 102 includes any component for receiving information about a gift-card and providing over network 106 a confirmation whether the gift-card is valid and/or who much value is left on the gift-card. In one embodiment, service 102 can use a database to store valid information for the gift-card and remaining values for the gift-card. In one embodiment, service 102, can receive over network 106 gift-card number and/or PIN code, and can determine by data comparison, or algorithmic determination whether the number and/or PIN code are valid.

Payment processor 130 includes any component for processing payments for a merchant transaction, including processing credit-card, online charges, gift-cards, checks, or the like. Payment processor 130 can include a fulfillment processor for fulfilling an order, an automated clearing house, bank-to-vendor electronic system, or the like.

Figure 2:
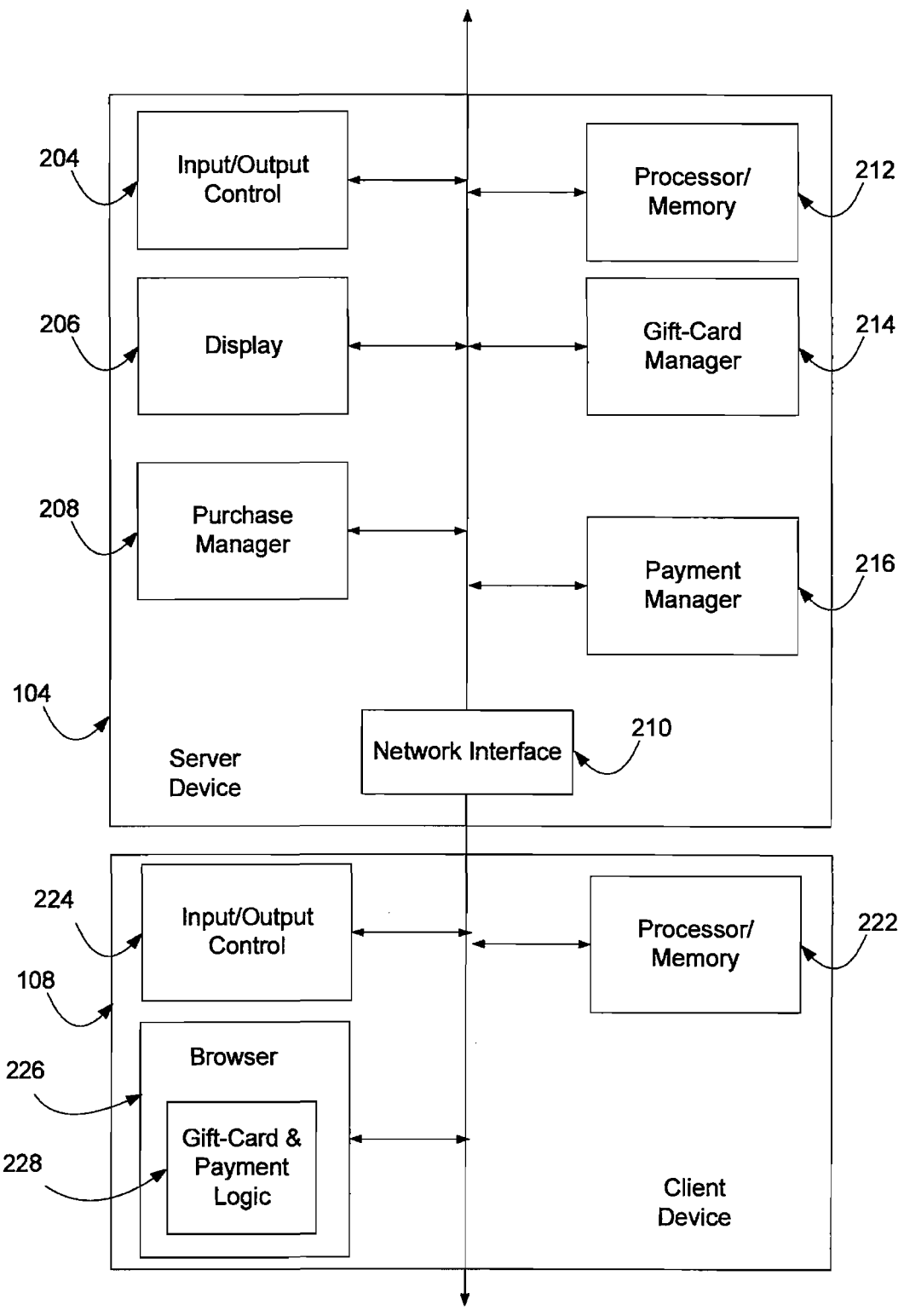
FIG. 2 shows a block diagram for one or more apparatuses for providing a check-out of a merchant transaction in accordance with one embodiment of the invention.

FIG. 2 shows a block diagram for one or more apparatuses providing a check-out of a merchant transaction in accordance with one embodiment of the invention. Device 200 of FIG. 2 can implement any of the components of FIG. 1, and in particular, client devices 108-109 and/or server device 104.

As shown in FIG. 2, client device 108 is in communication with server 104 over a communication channel. In one embodiment, client devices 108-109 and server 104 can be separate devices in communication over a computer network. The network communications can be via network interface 210. In one embodiment, client devices 108-109 and server 104 can be combined into the components of the devices of FIG. 2, wherein the client device 108 and server 104 are in communication over a communication interfaces, such as a bus. There can be more or fewer components without departing from the scope of the invention. For example, there can be other processors computing different aspects of the operations of the components of the devices of FIG. 2. In other embodiments, the processor of the client and the server can be the same processor. Also, other communication configurations can also be used besides client-server, such as a peer-to-peer configuration with a plurality of interconnected peers, wherein any node in the peer-to-peer network can perform the actions of the client devices 108-109 or server 104.

As shown, server device 104 comprises components in communication with each other, including input/output control 204, processor/memory 212, display 206 and browser 208. Input/output control 204 provides an interface for entering user commands and/or receiving feedback from the device. The control 204 can comprise a keyboard, mouse, sound output, haptic output, visual output, etc. Processor/memory 212 includes any computing component and/or computer memory component. For example, the processor includes any device for performing computerized operations, such as running a program based on processor-readable instructions stored within a memory such as RAM, ROM, EEPROM, hard-disk drive, etc. Browser 208 includes any component for providing a user interface. Browser 208 can provide promotion management. A user can manage the services provided in the browser and over display 206 using input/output control 204. Server device 104 includes purchase manager 208, gift-card manager 214 and payment manager 216. These components are in communication with each other and other components of device 104. Purchase manager 208, gift-card manager 214, and payment manager 216 may provide its information over network interface 210 as a API, AJAX interface, JSON interface, HTML data, or the like.

Purchase manager 208 includes any component for modifying a merchant transaction, including adding, removing, and modifying items from the merchant transaction. In one embodiment, purchase manager 208 may be configured to provide a purchase interface for modifying the merchant transaction in a side-by-side view with a gift-card redemption interface.

Gift-card manager 214 includes any component for redeeming a gift-card. Gift-card manager 214 can provide a gift-card interface over network interface 210. Gift-card manager 214 can receive data about the use of the gift-cards, as described herein, and can store such information in processor/memory 212. Gift-card manager 214 can send the gift-card data and/or other payment data over network interface 210 to third-party service for verification and/or processing of the merchant transaction.

Payment manager 216 includes any component for managing a plurality of additional payment options (e.g., non-gift-card payment options) comprising a credit-card payment option and a non-credit-card payment option. Payment manager 216 can provide a payment interface over network interface 210. Payment manager 216 can receive data about the use of the payment options, as described herein, and can store such information in processor/memory 212. Payment manager 216 can send payment data over network interface 210 to third-party service for verification and/or processing of the merchant transaction.

Client device 108 includes similar components as those in server device 104, including input/output control 224 and processor/memory 222. Server device 108 includes browser 226 which includes gift-card and payment logic 228. These components are in communication with each other and other components of device 108.

Browser 226 can receive various interfaces, including gift-card redemption interfaces, payment interfaces, purchase interfaces, or the like over a network. Browser 226 can receive logic for performing at least some of the steps of restricting a use of the gift-card redemption interface with the payment options; and processing the merchant transaction based on payments the gift-card. The received logic an be stored and executed as gift-card and payment logic 228. Logic 228 can be Javascript code, rules, or the like. Logic 228 can operate asynchronous with communications with the server device 104. That is, logic 228 can perform its processing without communicating with server device 104. Logic 228 can store some of its information locally on client device 108. Logic 228 can transmit its data to server device 104 after being processed and/or stored locally on the client device 108.

Figure 3:
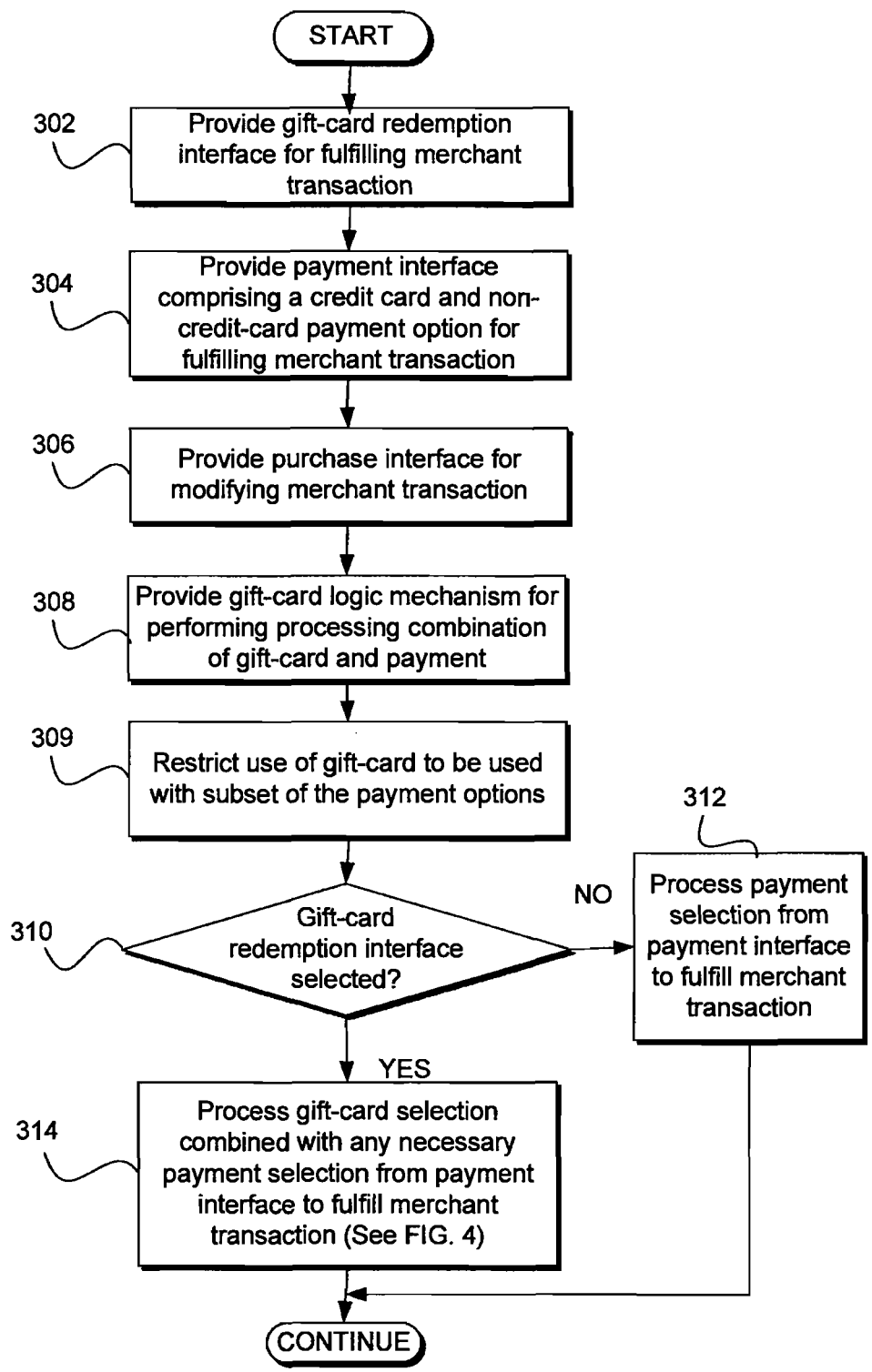
FIG. 3 shows an example of a process for providing a check-out of a merchant transaction in accordance with one embodiment of the invention.

FIG. 3 shows an example of a process for providing a check-out of a merchant transaction. The process of FIG. 3 can be performed by the components of FIGS. 1 and 2. The process of FIG. 3 can use the interfaces of FIGS. 5A-5J.

At step 302, a gift-card redemption interface for fulfilling merchant transaction is provided. In one embodiment, the gift-card redemption interface is configured for redeeming a gift-card. The gift-card redemption interface and the payment interface can be configured to be provided in a side-by-side view.

At step 304, a payment interface is provided, the payment interface comprising a credit-card and non-credit-card payment option for fulfilling merchant transaction. In one embodiment, the non-credit-card payment option comprises a bill-me-later option or a payment from an online account. The online account can be a PayPal account.

At step 306, a purchase interface for modifying merchant transaction is provided. In one embodiment, the purchase interface is provided in a side-by-side view with the gift-card redemption interface and/or the payment interface. The purchase interface can provide a shopper with selections for last-minute purchases to modify the merchant transaction. The shopper can also remove items from the merchant transaction and/or modify characteristics of the items. The purchase interface can include accumulating credit values based on making purchases. The credit values can be provided for fulfilling another merchant transaction or even the current merchant transaction.

At step 308, a gift-card logic mechanism for performing processing combination of gift-card and payment is provided. In one embodiment, the gift-card logic mechanism can be processor readable medium programming language code, rules, data, or the like. In a preferred embodiment, the logic mechanism can be Javascript code and data (e.g., cookies data) that is sent to a browser and executable and/or persistable in the browser. The logic mechanism can be executed asynchronously with communications with a web server. For example, the logic mechanism can use AJAX methods and technology. In yet another embodiment, at least a part or all of the gift-card logic can be provided to a server and executable on the server. The gift-card logic mechanism can be configured to perform operations comprising restricting or otherwise blocking a use of the gift-card redemption interface with the credit-card payment option; and processing the merchant transaction based on payments the gift-card, as described in the steps of 309-314.

At step 309, the use of gift-card is restricted to be used with a subset of the payment options, which includes one or some of the payment options, but not all of the payment options. In one embodiment, the subset includes the credit-card payment option. In general, certain combinations of gift-card and non-gift-card payment options may be restricted or blocked, while other combinations may be allowed. A user interface detection mechanism (e.g., restriction rules, triggers, or the like) may be used to restrict the uses of the gift-card and/or payment options. In a preferred embodiment, the provided payment option in the payment interface can be restricted to the credit-card payment option if a gift-card is selected. In another embodiment, if a payment option other than the credit-card payment option is selected, the gift-card selection in the gift-card redemption interface is disabled. Correspondingly, if the credit-card selection is activated, the gift-card selection is enabled.

At step 310, it is determined if the gift-card redemption interface is selected. The gift-card redemption interface can be used to enter a number of the gift-card. The gift-card redemption interface can be used to select a previously entered gift-card (e.g., that is authorized to be used). If so, processing continues to step 314. Otherwise, processing continues to step 312.

At step 312, a payment selection from the payment interface is processed to fulfill the merchant transaction. For example, a credit-card selection is entered by the user. Credit-card information, including credit-card number, name, address, access codes, or the like, are entered, verified, and stored. In one embodiment, the payment selection and the merchant transaction may be sent to third-party for processing and applying payments from the payment option to the merchant transaction.

At step 314, a gift-card selection combined with any necessary payment selection from the payment interface is processed to fulfill merchant transaction. The payment selection is restricted to the subset of payment options allowed to be used with a gift-card. The process of step 314 is described in more detail in FIG. 4.

Figure 4:
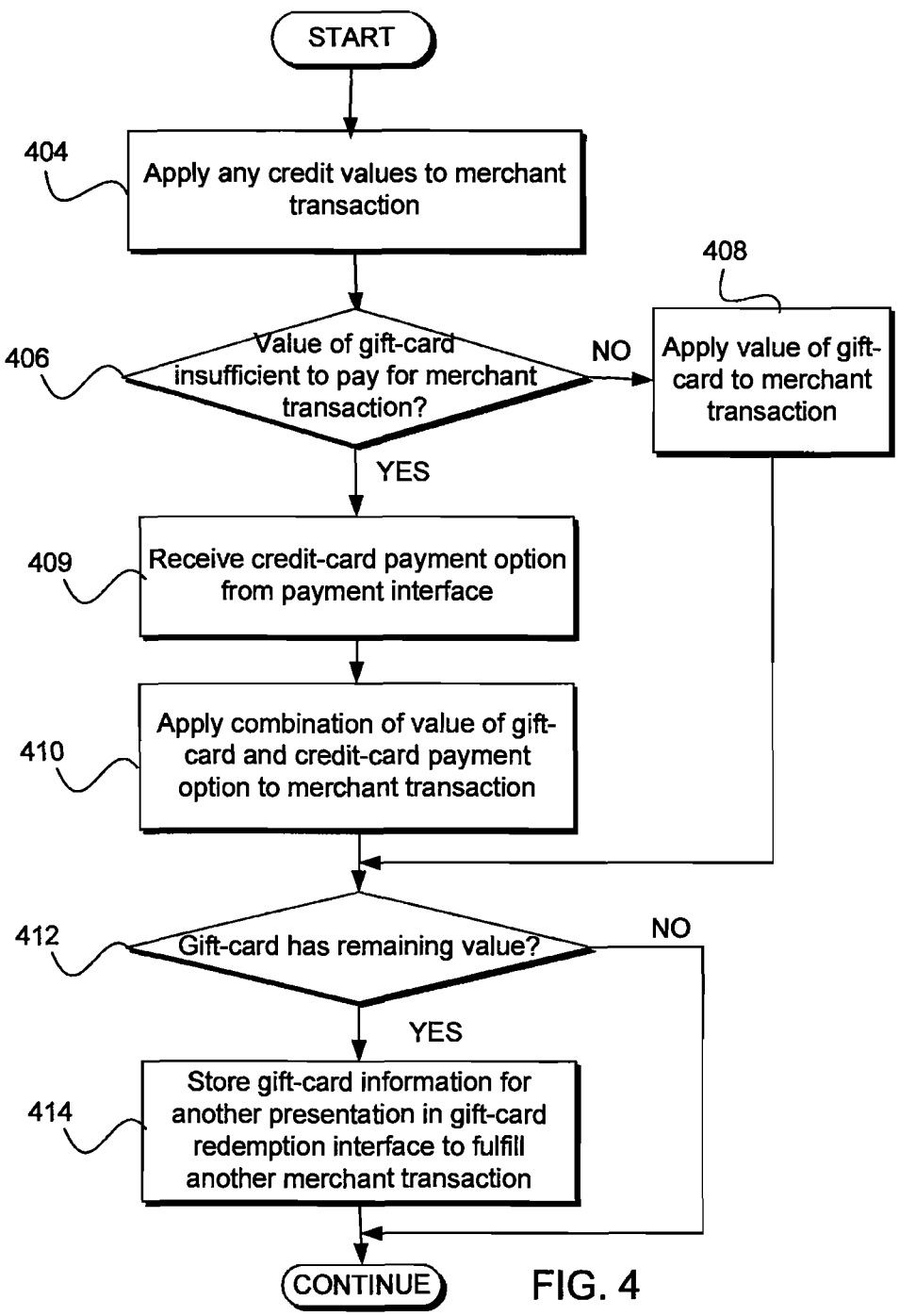
FIG. 4 shows an example of a process for processing a check-out of a merchant transaction using a gift-card redemption in accordance with one embodiment of the invention.

FIG. 4 shows an example of a process for processing a check-out of a merchant transaction using a gift-card redemption. The process of FIG. 4 can be performed by the components of FIGS. 1 and 2. The process of FIG. 4 can use the interfaces of FIGS. 5A-5J.

At step 404, any credit values that are available for the user and/or the merchant transaction are applied to the to merchant transaction. The credit values may be available based on the user, type of user, time of day, merchant, promotion period, local of purchase, type of purchase, price of purchase, or the like. The credit values can be created and stored from a use of the payment interface. In one embodiment, the credit value can be applied to the payments before processing the merchant transaction.

At step 406, it is determined whether the value of the gift-card is insufficient to pay for the merchant transaction. The determination can be a comparison of the value of the gift-card and the amount of the merchant transaction. If so, processing continues to step 409. Otherwise, processing continues to step 408.

At step 408, the value of gift-card is applied to the to merchant transaction. The value of the gift-card can be deducted from the amount of the merchant transaction. Processing then continues to step 412.

At step 409, the credit-card payment option is received from the payment interface. The credit-card payment option can be processed such that an electronic debit is applied to an account of a user (e.g., in a bank, a fund, or the like), and a credit applied to the fulfillment of the merchant transaction. In one embodiment, the amount of the payment can include an amount needed to make up for the short-fall in the gift-card.

At step 410, a combination of a value of gift-card and a credit-card payment option is applied to the merchant transaction. The combined amount of the gift-card and any necessary payment form the credit-card payment option to make up for the short-fall in the gift-card can be deducted from the amount of the merchant transaction. The combined amount can be sent to a third-party payment processor for processing.

At step 412, it is determined whether the gift-card has any remaining value. The value of the gift-card can be subtracted from the amount of the merchant transaction, and if a positive amount remains, it is determined that there is a remaining value. If so, processing continues to step 414. Otherwise, processing returns to other processing.

At step 414, gift-card information is stored for another presentation in the gift-card redemption interface to fulfill another merchant transaction. For example, the gift-card information can be provided again in step 302 of FIG. 3. The gift card's information can be retained and/or synchronized with the gift card's usage at a store, for example, using a database update, storing the amount available for the gift card on a database, or the like. Processing then returns to other processing.

FIGS. 5A-5J show examples of user interfaces and a process for providing a check-out of a merchant transaction. The process and user interfaces of FIGS. 5A-5J can be provided by the components of FIGS. 1 and 2. The interfaces can be provided as a web page implementing client-side and client-server functionality, including operations that are performed within the browser that is asynchronous with communications with the server, such as AJAX operations, Dynamic-HTML operations, or the like. In one embodiment, the interface can be provided in a touch interface and the user enabled to enter information by tapping or otherwise touching the interface, moving the touch across the interface or the like. In other embodiments, the interface can be provided as a stand-alone application.

The interface can be provided as a graphical representation of a digital closet, wherein the user can manage the cards, or other tenders associated with the user, using selections of images associated with the tenders, as described below.

Generally, the logic of the user interface can be received over a network (e.g., from a web server) and executed within the browser. The logic of the user interface can control how gift-cards can be combined with other payments. For example, the logic restrict the credit-card payment to be received from a user if there is a remaining balance after applying the funds of the gift-card. The logic can also prevent combining gift-card with PayPal or bill-me-later option, as shown. For example, when using the gift-card, the PayPal and bill-me-later tabs may be "grayed out."

The financial logic, including any combinations of determining shipping costs, taxes, application of credit values, application of gift-card values, verification of payment options, or the like can be executed within the browser on a client, as opposed to on a server. For example, the browser can dynamically validate the gift-card, promotion codes (credit values), calculates the amounts for the merchant transaction, remaining balances, or the like, and present such information through the interfaces and control the flow of the interfaces.

The user interfaces and logic can save information about the gift-cards used or those gift-cards with remaining balances for future purchases.

Each of the interfaces of FIGS. 5A-5J include some common components such as an interface for shipping information 501, payment information 507, review and place order interface 508, current selected items 503 for adding, removing, modifying, or otherwise managing the selected items of the merchant transaction to be processed, credit/discount code interface 504 for entering a code credit value to the transaction, a purchase interface 505 for adding items to the selected items 503, and next button 506 for causing the interface to move to a next step in the process and providing the next interfaces shown in FIGS. 5A-5J. Purchase interface 505 and selected items 503 enable adding and removing items from the merchant transaction, such as adding "last minute items."

Credit/discount code interface 504 can integrate payment with "credit value" usage. For example, the user can accumulate "credit values" for their purchase(s). When the credit for a user reaches a threshold, the user receives a discount code (e.g., via email) which can be used to reduce the price of products for purchase online or at a store. The user can enter the code into interface 504.

The user is also enabled by the interface to navigate to other sections such as the payment interface 507 or review 508 by clicking on the interface or the next button 506 if enough information has been entered to reach the appropriate interfaces.

Figure 5A:
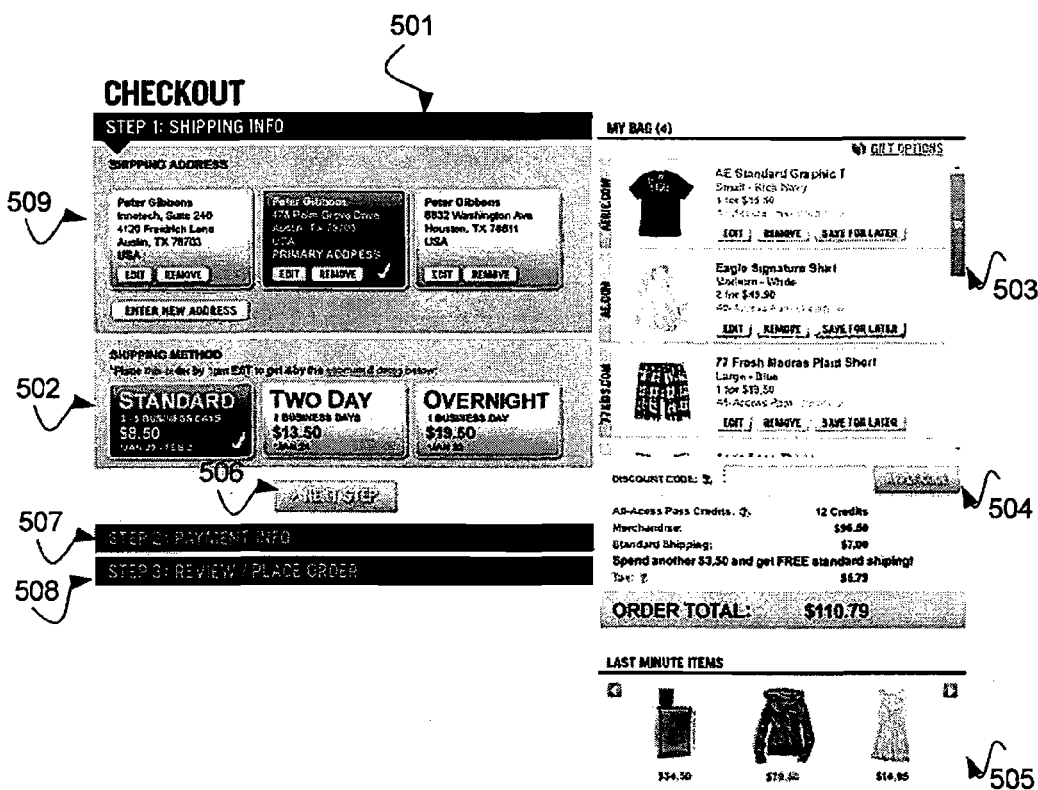

At the interface of FIG. 5A, using shipping information interface 501, the user is enabled to select shipping information 509 associated with the user and/or transaction. The user is enabled to also select to enter new shipping information. The user is enabled to select the shipping methods 502. If it is determined that the user selects to enter new shipping information, processing continues to FIG. 5B. Otherwise, processing continues to FIG. 5E.

Figure 5B:
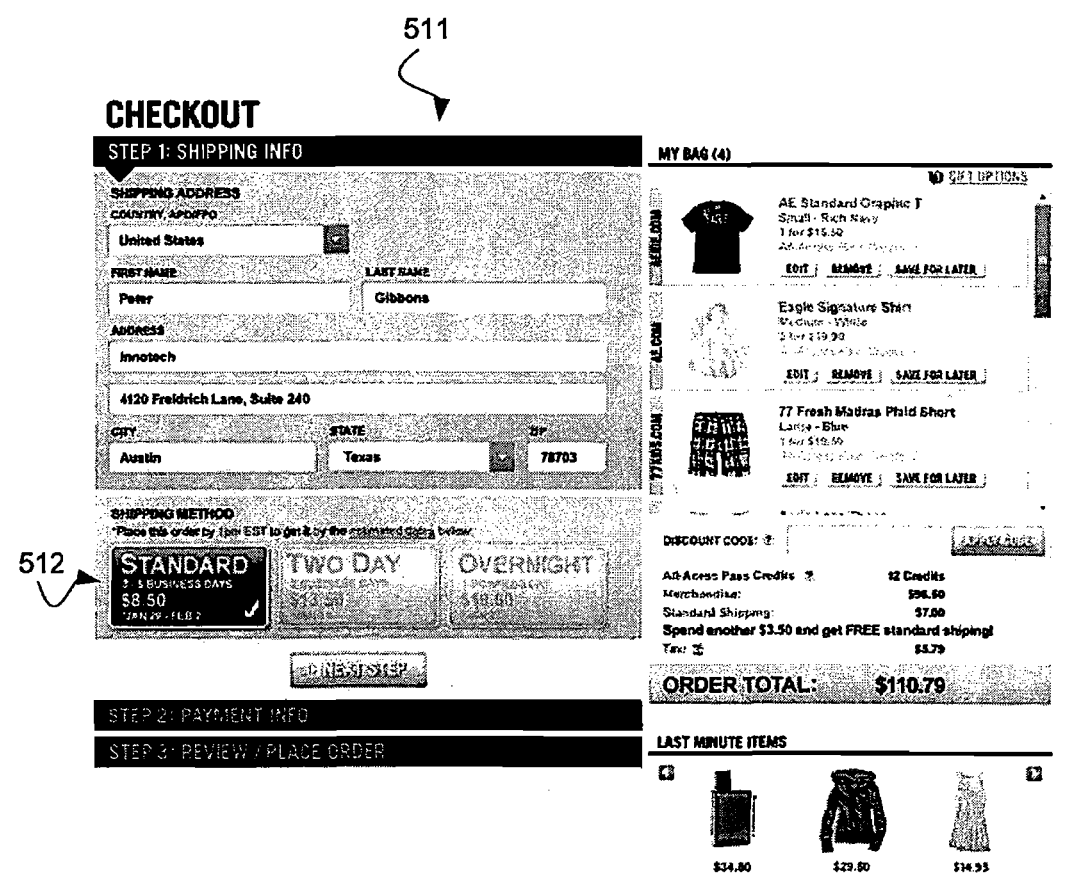

At the interface of FIG. 5B, the user is enabled to enter shipping information, including name and address, and the user is enabled to select the type of shipping 512, including standard shipping. As shown, the type of shipping may be limited (e.g., graying-out non-available methods) until the shipping information can be verified. Processing continues to the interface of FIG. 5C.

Figure 5C:
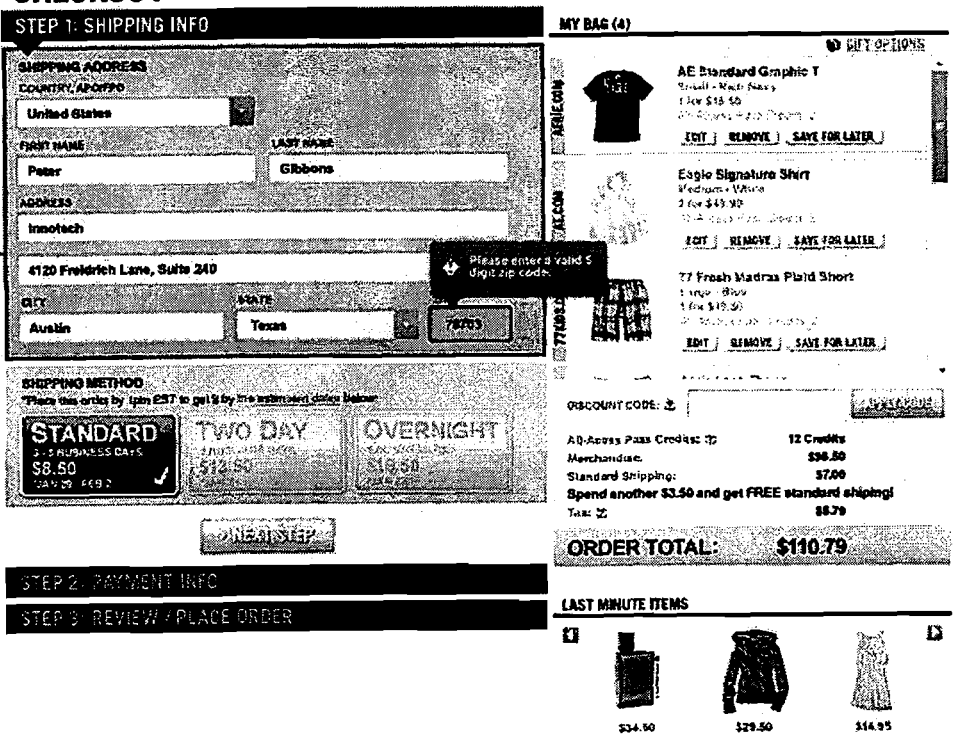

At the interface of FIG. 5C, the shipping information can be verified, and if the shipping information is incorrect or otherwise determined to be problematic, error indication 520 may be provided. The indication can point to the specific entry that is problematic. After fixing the entry, processing continues to the interface of FIG. 5D.

Figure 5D:
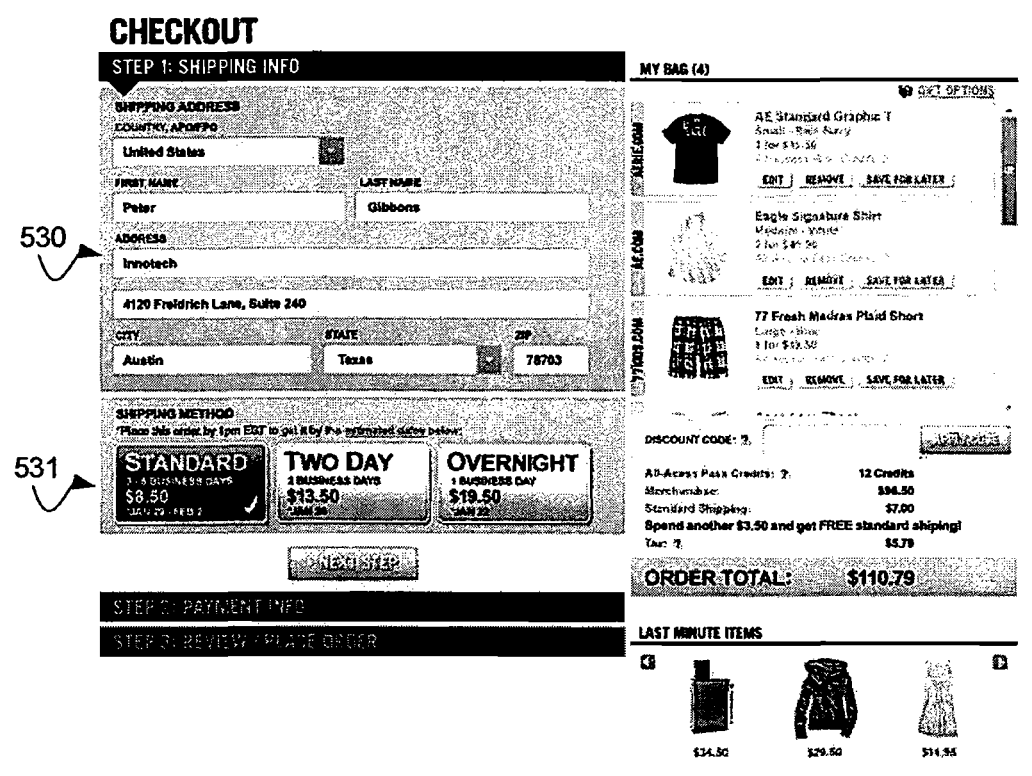

At the interface of FIG. 5D, after entry of the appropriate shipping information 530, a plurality of shipping methods 531 can be provided for the user to select to send the purchased items after they are fulfilled. Processing continues to the interface of FIG. 5E.

Figure 5E:
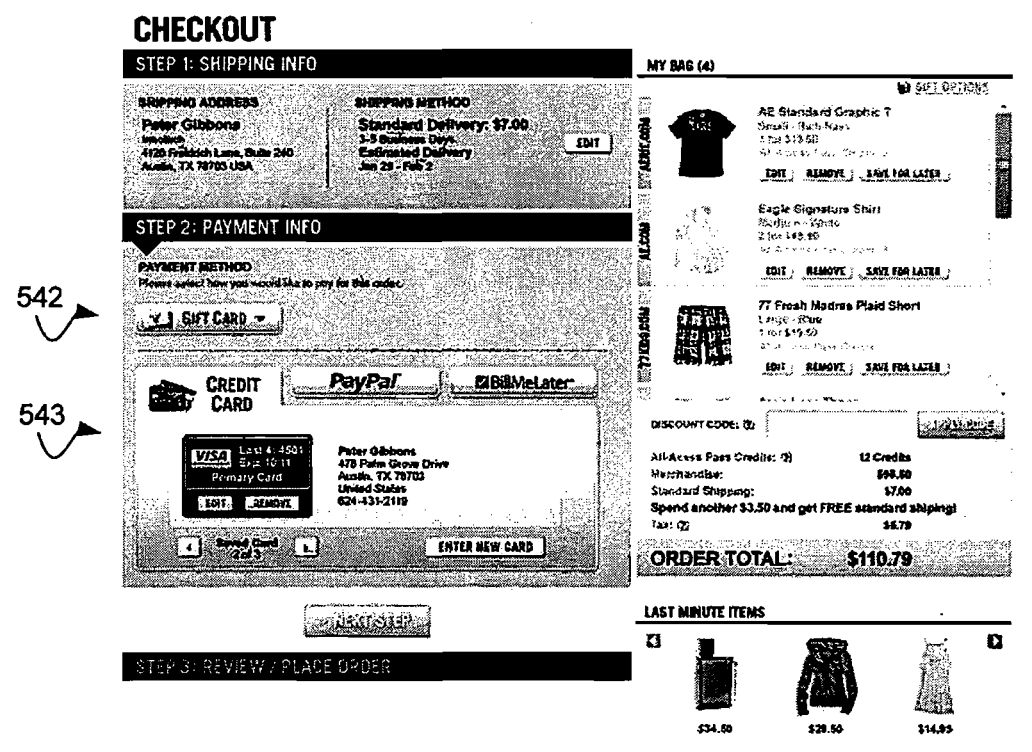

At the interface of FIG. 5E, a user is enabled to select the credit-card payment option from payment interface 543, e.g., by clicking on the "credit-card" tab. As shown, the user interface of FIG. 5E provides a side-by-side view of the gift-card redemption interface 542 and payment interface 543 that provides other payments used to make a purchase. If a credit-card is associated with the current transaction and/or user, the user is enabled to select to use the associated credit-card from payment interface 543. The user is enabled to flip-through the credit-card stored by dragging a mouse over the interface 543 left or right to go to the previous or next card. Or the user is enabled to click on the "<" previous or ">" next button. The user is enabled to also select to combine the credit-card payment with a gift-card payment by selecting gift-card redemption interface 542. In one embodiment, by selecting the credit-card payment option from payment interface 543, the gift-card redemption interface 542 is enabled to be used (e.g., is activated to receive inputs and highlighted using a user-interface indication). If it is determined that the user selects to enter a particular credit-card for interface 543, processing continues to the interface of FIG. 5F. If it is determined that the user selects gift-card redemption interface 542, processing continues to FIG. 5G. Otherwise, the user is enabled to go to FIG. 5J. The user is enabled to go to this next step of FIG. 5J by clicking a button such as a next button, and/or the interface may automatically flow to the next step after a time delay, or the like.

Figure 5F:
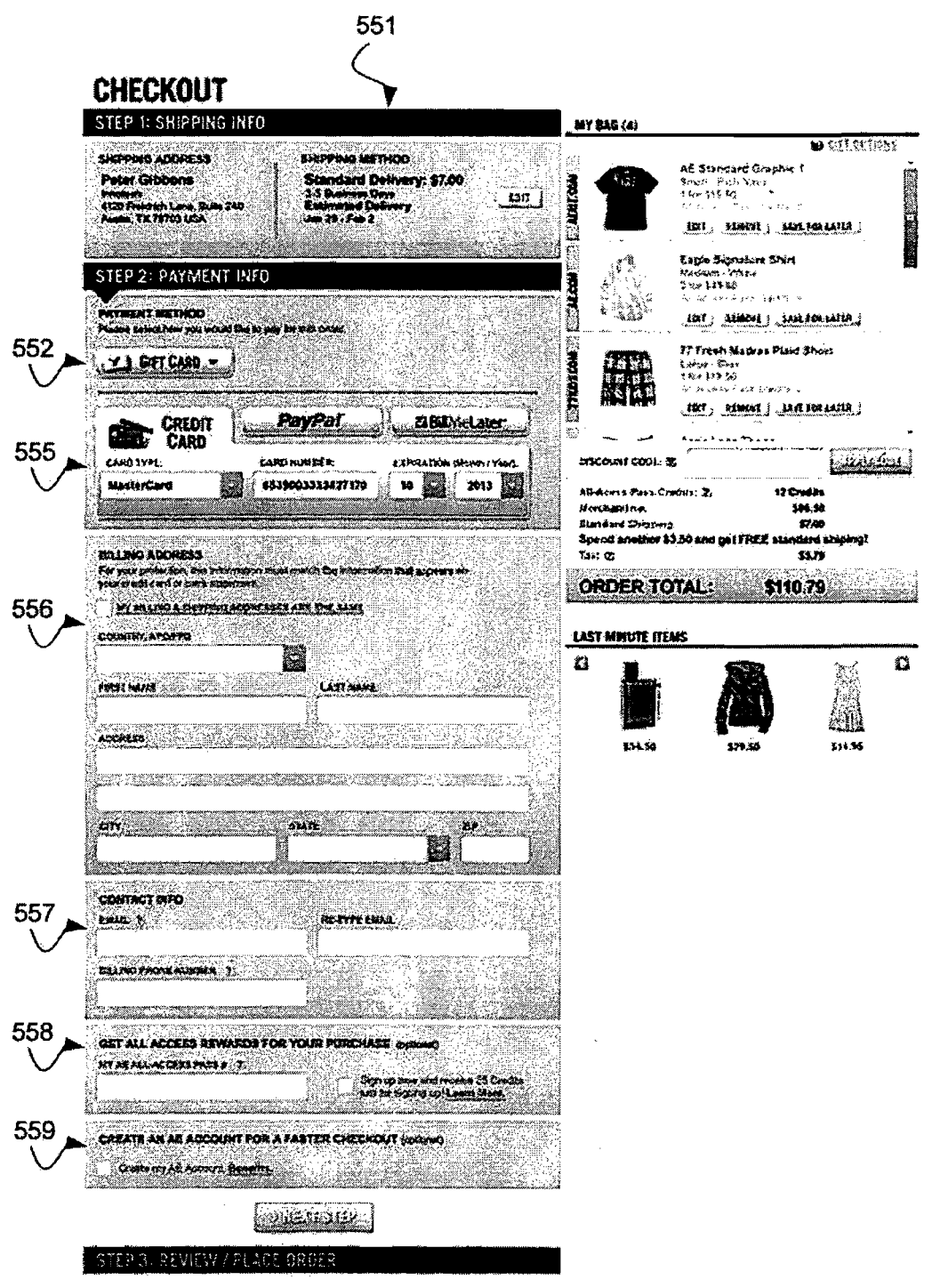

At the interface of FIG. 5F, the user is enabled to enter credit-card information, including the type of card, the credit-card number, expiration date, and access codes for interface 555, billing information 556, contact information 557, and the like. The user is enabled to also redeem credit values available for the user and/or transaction by entering a code in credit value interface 558. The user is enabled to save away the information entered (e.g., credit-card, gift-card, credit value codes, etc) to be associated with the user for other transactions by selecting account interface 559. If it is determined that the user selects gift-card redemption interface 552, processing continues to FIG. 5G. Otherwise, processing can continue to FIG. 5J.

Figure 5G:
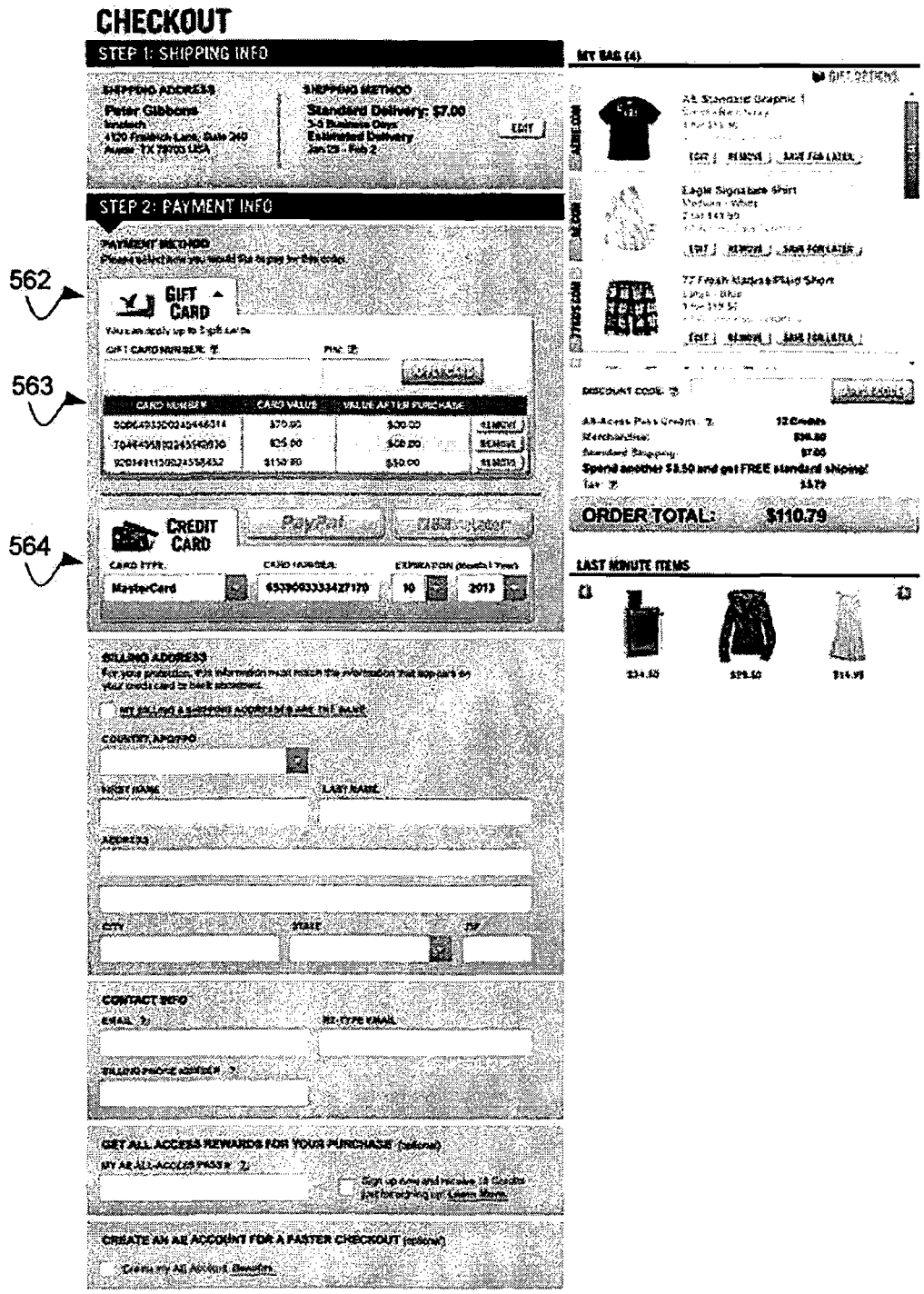

At the interface of FIG. 5G, a side-by-side view of gift-card redemption interface 562-563 is provided with the other components shown, including payment interface 564. The gift-card redemption interface 562 includes a mechanisms to add a new gift-card, including a gift-card number, a pin, and a button to apply the card, and to cause the system to save the card for later use. The interface 562 also includes the selection of saved gift-cards 563 for this user and/or transaction and the ability to remove the gift-cards 563. The interface can also provide the expiration date of the gift card(s). In this way, a user can decide to use gift cards that are closer to expiration date so that the value of the gift cards will not be wasted. The value of the gift cards before and after purchase may also be provided. As shown, the interface 562-563 can comprise at least a portion of the digital wallet for the user, to enable the user to manage the tenders associated with the user. The interface enables the user to pay a remaining balance using a credit-card using payment interface 564 which includes interfaces 555-559. While the full-credit-card entry screen for interface 564 is shown side-by-side with gift-card redemption interface 562-563., FIG. 5G can also provide merely the selection of the credit-card as shown in FIG. 5E along with the gift-card redemption interface 562-563. Processing continues to the interface of FIG. 5J.

Figure 5H:
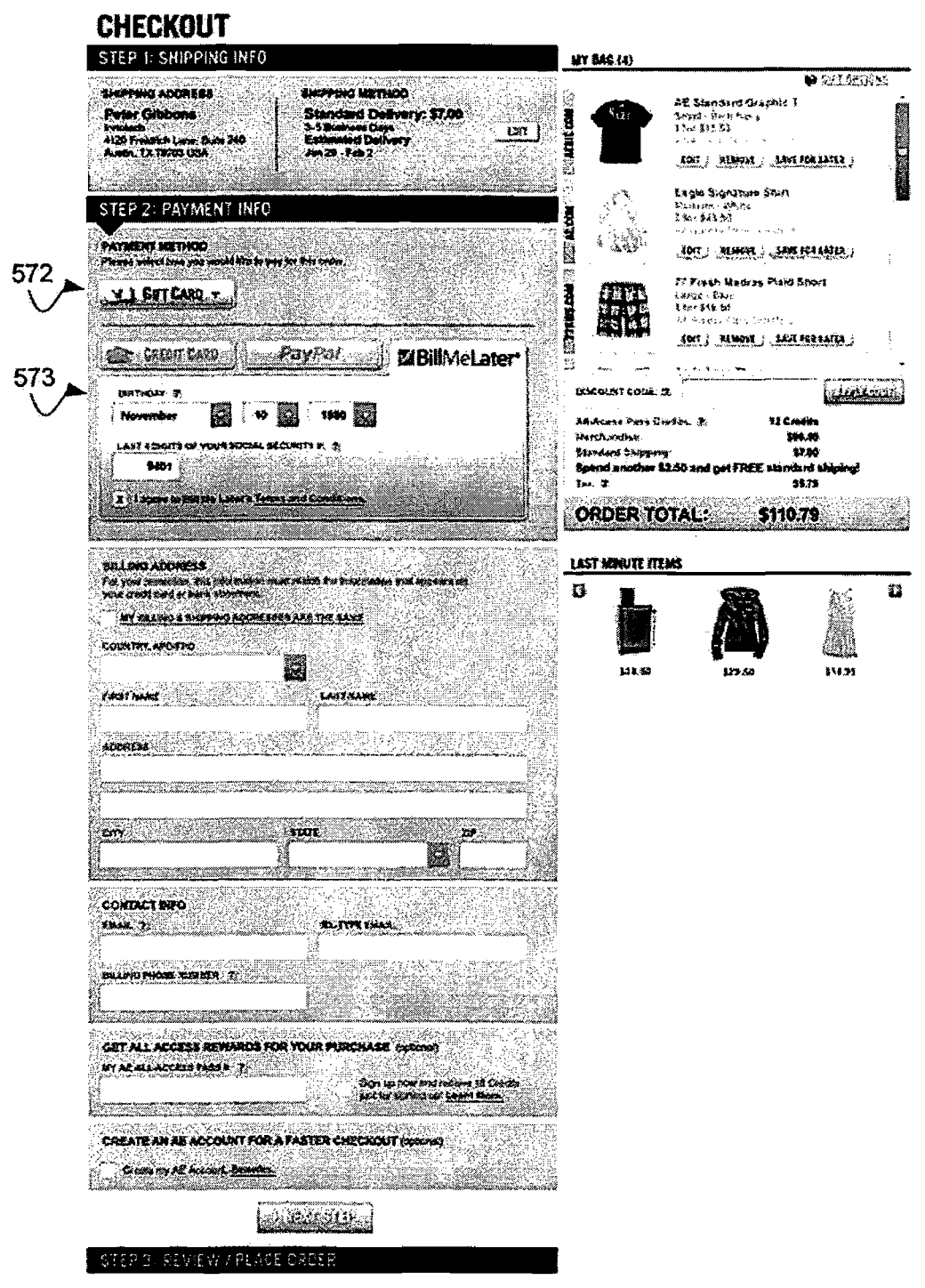

At the interface of FIG. 5H, the user is enabled to select to enter a bill-me-later option by selecting the bill-me-later tab of payment interface 573 and entering appropriate information such as birth date, social security information, and information for interfaces 556-559. If it is determined that the user selects the bill-me-later option, gift-card redemption interface 573 is disabled. The system can then create a time trigger to send a bill to the user at a later time for the merchant transaction.

Figure 5I:
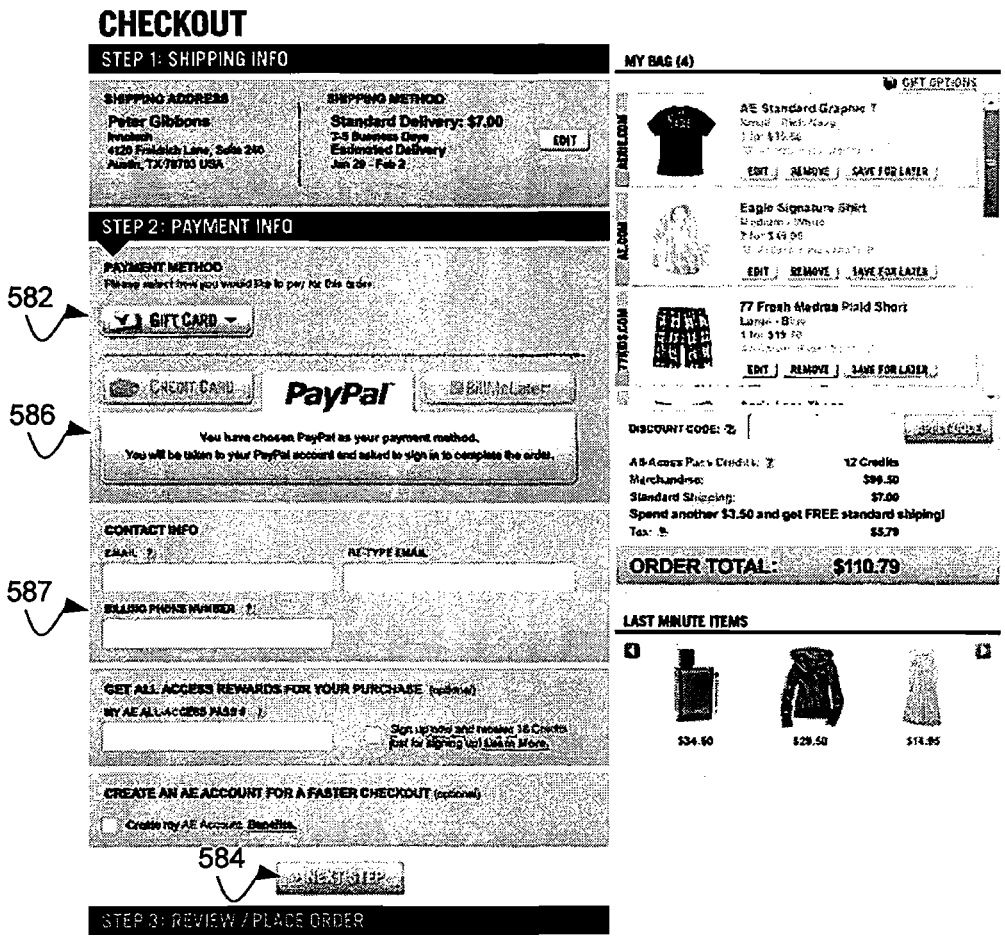

At the interface of FIG. 5I, the user is enabled to select to enter an option to pay from an online account (e.g., a PayPal option) by selecting the appropriate tab (e.g., PayPal tab) of payment interface 586 and entering appropriate information such as contact information 587 and information for interfaces 558-559. If it is determined that the user selects the online account option, gift-card redemption interface 582 is disabled.

Figure 5J:
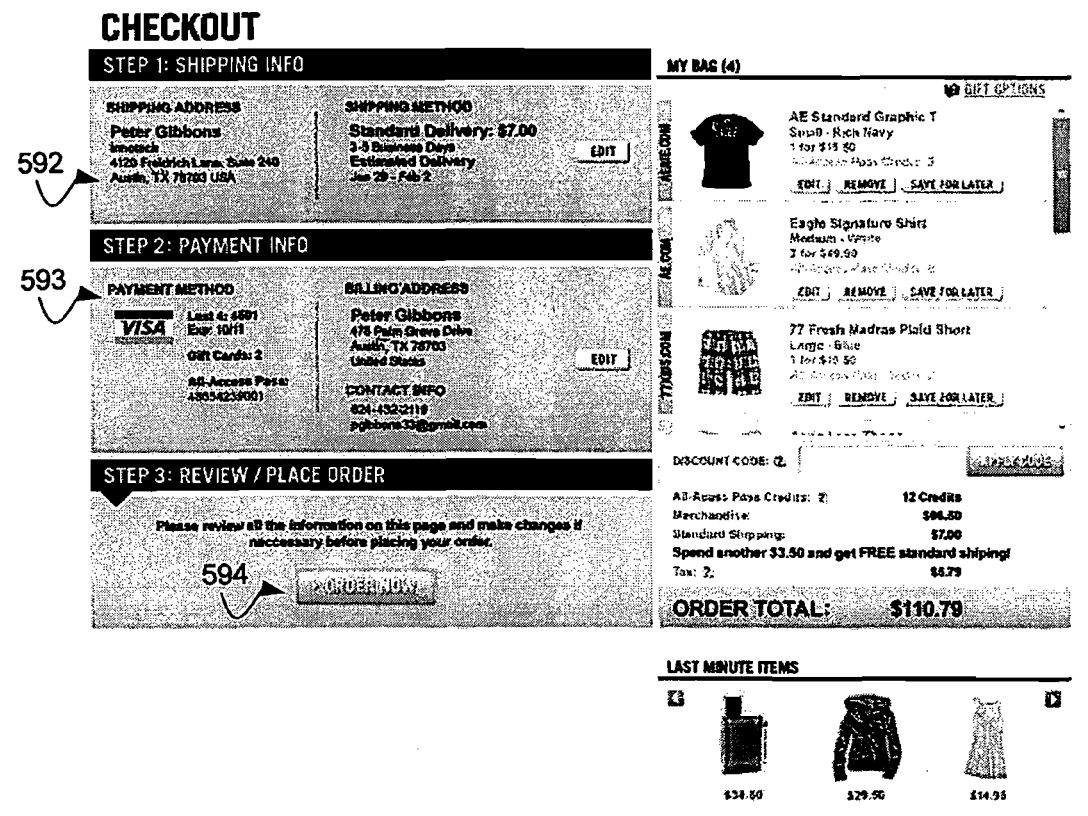

At interface of FIG. 5J, the user is enabled to review the merchant transaction and place the order. The user can review the shipping information 592, the payment information 593 which includes payment options and any gift-card applications, the selections for the merchant transaction, or the like. If it is determined that the user selects to place the order, e.g., by pressing button 594, the information shown, including the gift-card and the payment option are processed. The processing can include sending the information to a third-party for fulfillment of the transaction, debiting the user's account and/or crediting the merchant's account, shipping the items, or the like. In one embodiment, a restricted combination of payments such as gift card payments with non-credit card payments may be blocked from being processed and/or and error may be returned when such a combination is sent to be processed. The blocking can be performed by rules, database triggers, or the like. Processing then returns to other processing.

In general, the processing describe in FIGS. 3, 4, 5A-5J may be performed in real-time, automatically, as data becomes available, and/or based on user input. The interfaces described above can be modified dynamically on a client device without the need to refresh a browser page, using for example AJAX and/or asynchronous communication with a server. In one embodiment, aspects of the information displayed may be changed as the user makes selections, provides input or the like. For example, the type of payments available may be dynamically and automatically blocked or made available based on the selection of at least one gift card. The value of gift card available before and after a purchase (e.g., post transaction) may be dynamically changed or otherwise projected based on adding or changing the price of items, the number of items in a shopping cart, the items purchased, the shipping method, or the like. The addition of items to a shopping cart may be based on the drag-and-drop of items or addition of items from a digital closet as described in U.S. patent application Ser. No. 12/575,299.

It is to be understood that the invention is not to be limited to the exact configuration as illustrated and described herein. Accordingly, all expedient modifications readily attainable by one of ordinary skill in the art from the disclosure set forth herein, or by routine experimentation there from, are deemed to be within the spirit and scope of the invention as defined by the appended claims.

For the sake of brevity, it should be understood that certain structures and functionality, or aspects thereof, of embodiments of the present invention that are evident from the illustrations of the Figures have not been necessarily restated herein.

A computer or processor readable medium such as a floppy disk, CD-ROM, DVD, etc. may be use to store the processes, techniques, software, and information illustratively described herein. The media may store instructions, which when executed by a computer processor causes the processor to perform the processes described herein. The media can also be stored on devices, such as a server device, within a database, within main memory, within secondary storage, or the like.

Further still, the memory of the system may comprise a magnetic hard drive, a magnetic floppy disk, a compact disk, a ROM, a RAM, and/or any other appropriate memory. Further still, the computer of the system may comprise a stand-alone PC-type micro-computer as depicted or the computer may comprise one of a mainframe computer or a mini-computer, for example. Further still, another computer can access the software program being processed by the CPU by utilizing a local area network, a wide area network, or the Internet, for example.

The preceding description is presented to enable any person of ordinary skill in the art to practice the present invention. Various modifications to the preferred embodiment will be readily apparent to those of ordinary skill in the art, and the principles defined herein may be applied to other embodiments and applications without departing from the spirit and scope of the invention. Thus, the invention is not intended to be limited to the specific embodiments shown, but the claims are to be accorded an appropriate scope consistent with the principles and features disclosed herein as understood by skilled artisans. The figures are not necessarily to scale, some features may be exaggerated to show details of particular components. Therefore, specific structural and functional details disclosed herein are not to be interpreted as limiting, but merely as a basis for the claims and as a representative basis for teaching one skilled in the art to variously employ the present invention.

What is claimed is:

1. A method for providing a check-out of a merchant transaction comprising:
in a device:
providing a gift-card redemption interface for redeeming a gift-card to fulfill the merchant transaction;
providing a payment interface for presenting a plurality of additional non-gift-card payment options comprising a credit-card payment option and a non-credit-card payment option to fulfill the merchant transaction, wherein the merchant transaction includes at least one item that is redeemable with the gift card and purchaseable with the plurality of additional non-gift-card payment options;
providing a mechanism for performing operations comprising:
restricting a use of the gift-card redemption interface with at least one of the plurality of additional non-gift-card payment options; and
processing the merchant transaction based on a payment from the gift-card that fulfills at least a portion of the merchant transaction.

2. The method of claim 1, wherein the gift-card redemption interface and the payment interface are configured to be provided in a side-by-side view, and wherein the non-credit-card payment option comprises a bill-me-later option or a payment from an online account.

3. The method of claim 2, further comprising:
providing a purchase interface for modifying the merchant transaction in a side-by-side view with the gift-card redemption interface.

4. The method of claim 1, wherein restricting the use of the gift-card redemption interface comprises at least one of:
disabling a user interface entry for the non-credit-card payment option if the gift-card redemption interface is selected; or
restricting a use of a combination of the gift-card and at least one of the non-gift card payment options for fulfilling the merchant transaction.

5. The method of claim 1, wherein processing the merchant transaction is further based on another payment from the credit-card payment option if a value of the gift-card is insufficient to fulfill the merchant transaction.

6. The method of claim 1, further comprising:
providing a credit value for fulfilling another merchant transaction; and applying the credit value to the payment before processing the merchant transaction.

7. The method of claim 1, further comprising:
storing in a computer memory information about any remaining balance on the gift-card after processing the merchant transaction; and
providing the gift-card with the remaining balance as an option for fulfilling another merchant transaction.

8. The method of claim 1, wherein processing the merchant transaction further comprises:
sending, to a payment processor, the merchant transaction and payment.

9. The method of claim 1, wherein providing the gift-card redemption interface further comprises:
providing an entry for a gift-card or a selection of at least one available gift-card for a user authorized to fulfill the merchant transaction.

10. The method of claim 9, wherein the gift-card redemption interface provides a management of a plurality of gift-cards, wherein the management comprises adding or removing the gift cards, or modifying attributes of the plurality of gift-cards.

11. The method of claim 1, wherein providing the gift-card redemption interface and providing the payment interface are performed by a server device, wherein the server device provides the interfaces over a network to a client device, and wherein restricting the use of the gift-card redemption interface with at least one of the plurality of additional non-gift-card payment options is performed by the client device.

12. The method of claim 11, wherein restricting the use of the gift-card redemption interface with at least one of the plurality of additional non-gift-card payment options is performed by a browser operating with the client device, and wherein the browser receives the interfaces, restricts the use of the gift-card, and receives a combination of the gift-card and the credit-card payment option asynchronous with communications to the server device.

13. The method of claim 12, wherein the payment interface is provided as a flip-through interface that operates within the browser asynchronous with communications to the server device.

14. A system for providing a check-out of a merchant transaction comprising:
a server device that is configured to perform actions comprising:
providing a gift-card redemption interface for redeeming a gift-card to fulfill the merchant transaction;
providing a payment interface for providing a plurality of additional non-gift-card payment options comprising a credit-card payment option and a non-credit-card payment option to fulfill the merchant transaction;
causing a client device to restrict a use of the gift-card redemption interface with a provided payment option of the plurality of additional non-gift-card payment options.

15. The system of claim 14, further comprising:
a client device in communication with the server device, the client device configured to perform actions comprising:
restricting the use of the gift-card redemption interface with the provided payment option of the plurality of additional non-gift-card payment options; and
processing the merchant transaction based on a payment from the gift-card that fulfills at least a portion of the merchant transaction.

16. The system of claim 14, wherein the actions of the client device further comprise:
providing the gift-card redemption interface, the payment interface, and a purchase interface for modifying the merchant transaction in a side-by-side view.

17. The system of claim 14, wherein restricting the provided payment option comprises:
disabling a user interface entry for the non-credit-card payment option or the gift-card redemption interface.

18. The system of claim 14, wherein processing the merchant transaction is further based on another payment from the credit-card option if a value of the gift-card is insufficient to fulfill the merchant transaction.

19. A processor readable medium having stored thereon, a computer program having at least one code section for providing a check-out of a merchant transaction comprising instructions that when executed by a processor causes the processor to perform actions that comprises:
providing a gift-card redemption interface for redeeming a gift-card to fulfill the merchant transaction;
providing a payment interface for providing a plurality of additional non-gift-card payment options comprising a credit-card payment option and a non-credit-card payment option to fulfill the merchant transaction;
providing a mechanism for performing operations comprising:
restricting a use of the gift-card redemption interface with at least one of the plurality of additional non-gift-card payment options; and
processing the merchant transaction based on payments from a combination of the gift-card and any necessary amounts from the credit-card payment option if a value of the gift-card is insufficient to pay for the merchant transaction.

20. A processor readable medium having stored thereon, a computer program having at least one code section for providing a check-out of a merchant transaction comprising instructions that when executed by a processor causes the processor to perform actions that comprises:
receiving a gift-card redemption interface for redeeming a gift-card to fulfill the merchant transaction;
receiving a payment interface with a plurality of additional non-gift-card payment options comprising a credit-card payment option and a non-credit-card payment option to fulfill the merchant transaction;
restricting a use of the gift-card redemption interface with at least one of the plurality of additional non-gift-card payment options; and
processing the merchant transaction based on payments from a combination of the gift-card and any necessary amounts from the credit-card payment option if a value of the gift-card is insufficient to pay for the merchant transaction.

21. A computer implemented interface configured to:
in a device:
provide an ability to accept multiple cards for payments and to combine the card payments with other forms of tender to fulfill a merchant transaction;
automatically block determined combinations of tenders for fulfilling the merchant transaction; and
provide projected post transaction value of each of the multiple cards used for payments.

22. The interface of claim 21, further comprising:
a digital wallet configured to provide a plurality of images of the multiple cards, wherein the images are configured to be selected to activate the card to be used for payments.

23. The interface of claim 21, wherein the multiple cards comprise at least one gift-card.

24. The interface of claim 21, wherein the combinations of tenders are blocked real-time.

* * * * *